UNITED STATES PATENT OFFICE.

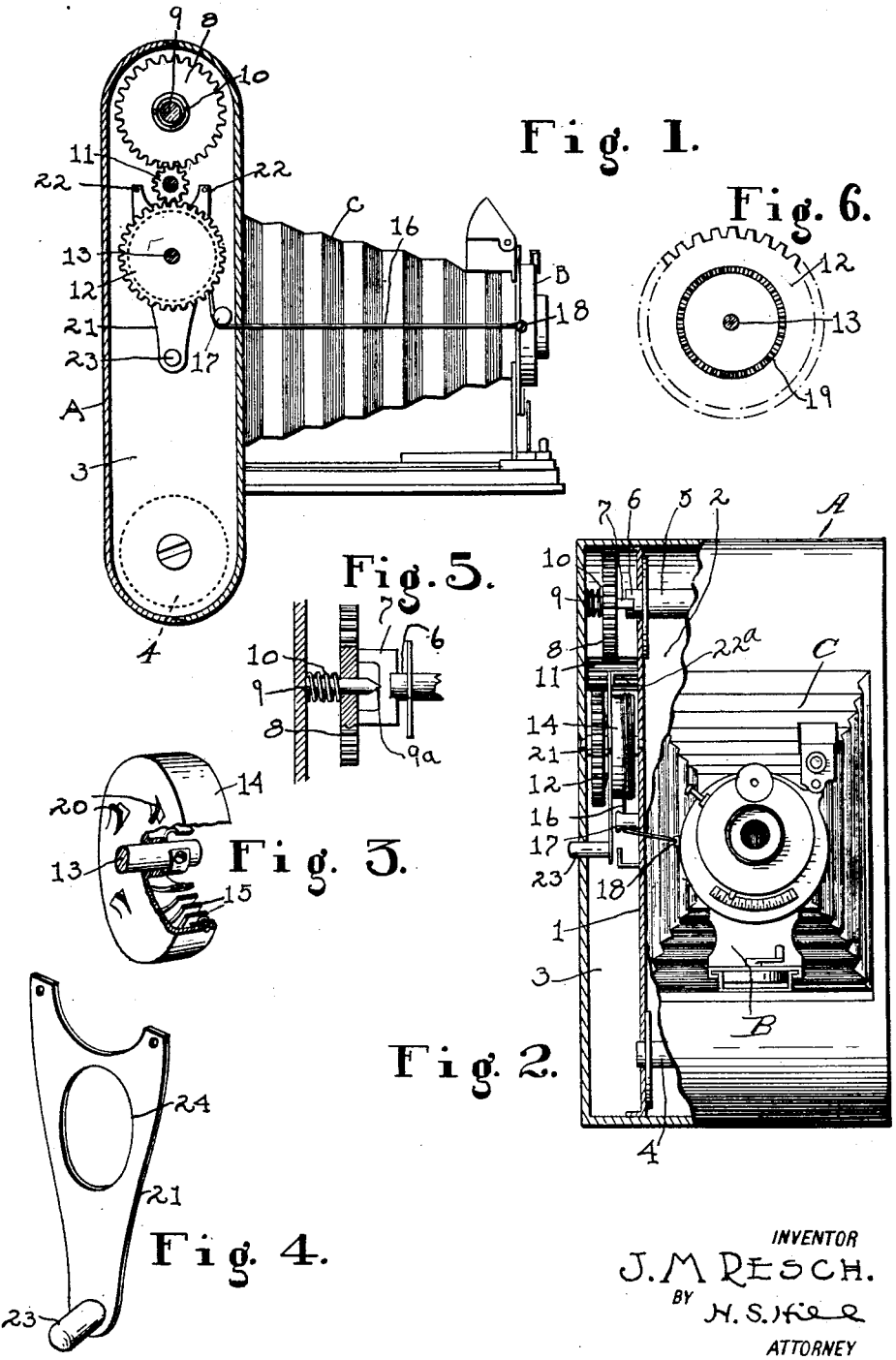

JOSEPH MARTIN RESCH, OF VALLEJO, CALIFORNIA.

AUTOMATIC CAMERA.

1,371,440. Specification of Letters Patent. Patented Mar. 15, 1921.

Application filed June 29, 1918, Serial No. 242,650. Renewed October 4, 1920. Serial No. 414,671.

*To all whom it may concern:*

Be it known that I, JOSEPH MARTIN RESCH, a citizen of the United States, residing at Vallejo, in the county of Solano, State of California, have invented a new and useful Automatic Camera; and I do hereby declare the following to be a full, clear, and exact description of the invention, such as will enable others skilled in the art to which it appertains to make and use the same.

The present invention relates to certain new and useful improvements in cameras of that type in which film cartridges are used and the exposures taken upon successive lengths of a film which is caused to pass through the camera by winding from one spool upon another spool, the object of the invention being to provide means whereby the film strip will be automatically moved the proper amount when the camera is opened up preparatory to taking a picture, thereby avoiding the possibility of making two exposures on the same film.

Further objects of the invention are to provide a camera of this type which will utilize the conventional film cartridges, which can be used in substantially the same manner as the ordinary camera, which provides for opening and closing the camera without moving the film strip when such is necessary, and which is not liable to get out of repair or adjustment.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a camera provided with film moving means embodying the invention, the casing of the camera being broken away to bring out more clearly the details of construction.

Fig. 2 is a front elevation of the camera with portions broken away and shown in section.

Fig. 3 is a detached perspective view of the spring actuated drum, portions being broken away and shown in section.

Fig. 4 is an enlarged detached perspective view of the clutch releasing spring.

Fig. 5 is a detail view showing the mounting for the film winding wheel.

Fig. 6 is a detail view showing the clutch face of the driving gear.

Corresponding and like parts are referred to in the following description and indicated in all the views of the drawings by the same reference characters.

Referring to the drawings, which illustrate one embodiment of the invention, the reference character A designates the body or casing of a camera, and B the front thereof which is connected to the casing by a conventional bellows C so that the camera can be collapsed in the well-known manner and carried in the pocket or packed in a small amount of space when not in use. The casing A is subdivided by a partition 1 into a main compartment 2 and a side chamber 3. The film is caused to pass through the back of the main compartment 2 in the usual manner so that exposures can be taken upon successive lengths thereof, the film being unwound from a spool 4 and wound upon a spool 5. These spools are of the conventional construction, being each provided at one end with a notched stud or projection 6 which is adapted to be engaged by a film winding device. The notched stud 6 of the spool 5 extends through an opening in the partition 1 and is engaged by a wing 7 on a spool turning gear wheel 8. This gear wheel is slidable on a shaft 9 and is held yieldably in operative position by the tension of a spring 10 which is interposed between the wheel and one side of the casing. The end of the shaft 9 is pointed at 9ª and engages a depression in the edge of the wing 7 when the spool 5 is in position, thereby holding the parts centered and providing a delicate bearing which offers a minimum amount of resistance. The film spool 5 may be conveniently placed in position from the opposite side of the camera, pushing the gear wheel 8 rearwardly against the action of the spring 10 until the pointed end 9ª of the shaft 9 engages the depression of the wing 7, at which time the parts are in their final position. The gear wheel 8 meshes with an idler 11, and this idler in turn meshes with a driving gear 12 which is loose on a shaft 13. A hollow drum 14 is loosely mounted upon the said shaft 13 at one side of the driving gear 12, and a spiral spring 15 which is housed within the hollow drum has one end thereof secured to the drum and the other end thereof secured to the shaft. A flexible cord 16 is connected to the exterior of the hollow drum 14, said cord passing around an anti-friction member or stud 17 and having the forward end thereof connected at 18 to the front B of the camera. When the camera is opened up, as indicated by Fig. 1, the flexible cord 16 is unwound from the hollow drum 14 and the spring 15 on the inside of the drum placed under tension. This unwinding of the flexible cord from the hollow drum causes the drum to rotate, and a clutch connection is provided between the drum and the driving gear 12 whereby the driving gear rotates with the drum as the cord is unwound therefrom, thereby turning the spool 5 and winding a sufficient length of the film strip thereon to bring a fresh portion of the film strip in position for an exposure.

The inner face of the driving gear 12 is provided with an annular series of inclined teeth 19 which form a clutch face, and these teeth are engaged by spring arms 20 projecting from the opposed face of the hollow drum 14. When the hollow drum is turned in one direction by the unwinding of the flexible cord 16 therefrom the spring arms 20 of the drum engage the clutch face 19 to rotate the driving gear 12 therewith and actuate the spool 5 to wind the necessary length of film thereon. However, when the hollow drum 14 rotates in the opposite direction under the action of the spring 15 to rewind the flexible cord 16 thereon, the spring arms 20 slip over the clutch face 19. It will thus be obvious that when the camera front B is pulled out to open up the camera the flexible cord 16 will be unwound from the hollow drum 14 and both the drum and driving gear 12 rotated to actuate the spool 5 and wind a length of film thereon, thereby bringing a fresh portion of the film strip in position to have an exposure made thereon. However, when the camera is collapsed by moving the camera front B backwardly into the casing A, the flexible cord 16 is wound upon the drum 14, the spring arms 20 of the drum slipping over the clutch face 19 of the driving gear 12, so that there is no movement of the film spool at that time. The film is thus automatically moved through the camera to bring a fresh portion thereof in position for an exposure each time the camera is opened up, thereby avoiding the necessity of manually winding the film each time an exposure is taken, and rendering it practically impossible to take two exposures on the same portion of the film.

A spring plate 21 extends between the driving gear 12 and hollow drum 14, the upper end of the plate being secured at 22 to bracket arms 22ª projecting from the partition 1, while the lower end thereof is provided with a button or finger piece 23 which projects through an opening in the side of the camera. The middle portion of the plate 21 is cut away at 24 to provide an opening of sufficient size to clear the clutch face 19 of the driving gear and the spring arms 20 of the hollow drum 14. These spring arms 20 of the hollow drum are normally in engagement with the clutch face 19, although when the button 23 is pressed inwardly the shifting plate 21 will slide the drum 14 away from the driving gear 12 and open the clutch by disengaging the spring arms 20 from the teeth 19. When the two elements of the clutch are thus moved out of engagement with each other the camera can be opened and closed without actuating the film winding mechanism. This enables the camera to be opened up without moving the film where the film was previously moved without making an exposure. The spiral spring 15 within the hollow drum 14 may be rigidly secured to the shaft and drum so that the side or lateral tension thereof will be sufficient to slide the drum into operative position as soon as the clutch opening plate 21 is released. Ordinarily only a single exposure is made each time the camera is opened up and in such cases the film will be automatically fed in the necessary manner without the necessity of manually winding the same. Where two exposures are taken at the same place, the camera can be closed and again opened in order to move the film, and this operation of opening and closing the camera is easier and quicker than that of manually winding the film in the conventional manner. Where it happens that the camera is opened up without taking an exposure, the button 23 can be pressed inwardly to open up the clutch when the camera is next opened, thereby preventing the actuation of the film winding mechanism and enabling a picture to be taken upon the unexposed portion of the film. It will be understood, of course, that the particular construction illustrated upon the drawing will only be operative in connection with a camera having such a construction that the front is always moved outward a predetermined position and locked the same distance from the camera body when a picture is taken.

Having thus described the invention, what I claim as new and desire to secure by Letters Patent, is:—

1. The combination with a camera including a casing and folding front, of a film winding member, a driving gear operatively connected to the film winding member, a spring drum, a clutch connection between the spring drum and the driving gear, means actuated by movement of the folding front of the camera for operating the spring drum, and means for opening the clutch connection between the drum and driving gear.

2. The combination with a camera including a casing and folding front, of a film winding member, a driving gear, gearing between the driving gear and the film winding member, a spring drum mounted at one side of the driving gear, a clutch connection between the drum and driving gear, and a flexible cord normally wound upon the drum and operatively connected to the folding front of the camera whereby the drum will be actuated by movement of the folding front.

3. The combination with a camera including a casing and folding front, of a film winding wheel provided with means for engaging a film spool, a driving gear, gearing between the driving gear and the film winding wheel, a spring drum at one side of the driving gear and movable toward and away therefrom, complemental clutch members on the opposed faces of the driving gear and drum, means for moving the drum away from the driving gear to break the clutch connection, and a flexible cord normally wound upon the drum and operatively connected to the folding front of the camera, whereby the drum will be actuated by movement of the folding front of the camera.

4. The combination with a camera including a casing and folding front, of a film winding wheel provided with means for engaging the film spool, a shaft, a driving gear mounted upon the shaft, gearing between the driving wheel and the film winding wheel, a spring actuated drum mounted upon the shaft, complemental clutch elements on the opposed faces of the driving gear and drum, a clutch controlled member extending between the driving gear and drum and adapted to be actuated to separate the members to break the clutch connection between the same, and a flexible cord normally wound upon the drum and operatively connected to the folding front of the camera whereby the drum will be actuated when the folding front is moved into operative position.

5. The combination with a camera having a casing and folding front, of a shaft having a pointed end, a film winding wheel loose on the shaft and provided at the center thereof with a lateral wing adapted to engage the notched end of a film spool, the edge of the wing being engaged by the pointed end of the shaft when a film spool is in position, yielding means normally tending to slide the film winding wheel into operative position, and means actuated by movement of the folding front of the camera to turn the film winding wheel and rotate the spool to feed the film as required.

In testimony whereof I have signed my name to this specification in the presence of two subscribing witnesses.

JOSEPH MARTIN RESCH.

Witnesses:
   H. G. HEYL.
   W. T. HESS.